3,063,218
CHLORINE DIOXIDE SEPARATION
John Carl Pernert, Niagara Falls, and Stanley I. Burghardt, Grand Island, N.Y., assignors to Hooker Chemical Corporation, New York, N.Y., a corporation of New York
No Drawing. Filed Feb. 23, 1956, Ser. No. 567,057
4 Claims. (Cl. 55—71)

This invention relates to processes for separating chlorine dioxide from admixture with other gases and is more particularly concerned with an improvement in the separation of chlorine dioxide from gaseous mixtures containing chlorine dioxide, chlorine, and air.

Chlorine dioxide has been widely proposed for the bleaching of pulp and flour, water purification, et cetera. One of the limitations on its use has been the difficulty of providing it in relatively pure form, substantially free from chlorine since most procedures for the synthesis of chlorine dioxide result in a substantial quantity of chlorine being concomitantly produced. Separation of this chlorine has been attempted by treating the gas mixture with cold water. Such separation, however, results in only about a five percent chlorine dioxide solution, containing some chlorine. Another problem in the separation of chlorine dioxide from chlorine arises out of the unstable nature of chlorine dioxide. At partial pressures greater than approximately 80 millimeters of mercury absolute, chlorine dioxide may explode with violence. Consequently, many problems arise in attempts to make large scale shipments of the gas. Various unsatisfactory answers to the problems outlined have been proposed, but none of these have received wide commercial acceptance. In general, the usual technique is to provide a chlorine dioxide generator at the point of use.

Among the principal objects of the present invention is the provision of a process for the separation of chlorine dioxide from a gaseous mixture containing air, chlorine, and chlorine dioxide. Still a further object of the present invention is to provide a composition containing readily available chlorine dioxide, suitable for shipping with minimum explosion hazards, and containing up to 35 percent chlorine dioxide.

We have discovered that silica gel will selectively adsorb chlorine dioxide from a gaseous mixture containing chlorine and chlorine dioxide. It is known that silica gel will serve as an adsorbent for chlorine, but it was unexpected and surprising to find that the silica gel will preferentially and selectively adsorb chlorine dioxide, even though the silica gel may have chlorine adsorbed thereon. Based on this finding, we have invented a process for separating chlorine dioxide from chlorine which includes the step of passing a substantially anhydrous gaseous mixture of said substances into a zone containing silica gel at a temperature below about 30 degrees centigrade. The chlorine and any other gases present in the mixture are vented from the adsorption zone and the gel carrying the chlorine dioxide is then available for transfer to the point of use. The chlorine dioxide is readily liberated by passing an inert gas such as air through the gel at a temperature above that at which the chlorine dioxide was adsorbed on the gel to entrain the chlorine dioxide.

The usual commercial grades of silica gel are useable as the adsorbent. Since silica gel tends to adsorb water as well as chlorine dioxide and chlorine, it is a prerequisite to treatment by the process of the present invention that the gaseous products to be introduced into contact with the silica gel be dry. Conventional drying materials may be utilized for this purpose, including, for example, activated alumina, calcium chloride, a first treatment with silica gel, et cetera, that is, any method whereby a substantially anhydrous gas is provided. Thereafter, this dry gas is led into contact with silica gel at temperatures below about 30 degrees centigrade, and preferably below about zero degrees centigrade. The amount of chlorine dioxide which will be adsorbed is inversely dependent on the temperature, the greater the temperature the less chlorine dioxide the silica gel will hold. The vapor pressure of any chlorine dioxide-silica gel composition increases as the temperature of the system rises, and also depends upon the ratio of chlorine dioxide to silica gel in the composition. The larger the ratio of chlorine dioxide to silica gel, the higher the vapor pressure of chlorine dioxide at a given temperature. However, the logarithms of the vapor pressure when plotted against the inverse of the absolute temperature produce, in each case, a straight line. These lines are parallel for each ratio of chlorine dioxide to silica gel.

During the adsorption, heat will be generated and this must be removed to maintain the rate of adsorption at a constant level. Pressure does not constitute a limiting aspect in the practice of the present invention and can be atmospheric or above. Because of the explosive nature of chlorine dioxide, the partial pressure of the chlorine dioxide in the introducing gases should not exceed about 100 millimeters of mercury pressure absolute. about 80 millimeters of mercury. The amount of silica gel to be used is that amount which will adsorb completely the chlorine dioxide from the starting introduced gaseous mixture. Up to 46 grams of chlorine dioxide per 100 grams of silica gel can be adsorbed at a temperature of about zero degrees centigrade. Economics dictate that a large excess of silica gel not be used, but a 20 to 25 percent excess is sometimes desirable. Because the silica gel tends to change in color from tan to a deep yellow-orange as the chlorine dioxide is adsorbed thereon, control by visual observation of the progress of the adsorption is possible.

Removal of the chlorine dioxide from the silica gel is readily accomplished by passing a dry gas, such as air, nitrogen, carbon dioxide, et cetera, in direct contact with the gel. The dried gas may be at room temperature, 25–30 degrees centigrade, or somewhat above room temperature, e.g., up to about 50 degrees centigrade. The amount of chlorine dioxide removed from the silica gel in the dry gas is approximately equivalent to that which results from a usual chlorine dioxide generator such as is known in the art. The silica gel containing the chlorine dioxide adsorbed thereon can be readily shipped, with minimization of the usual danger of shipping gaseous chlorine dioxide, and utilized at a distant point. The silica gel can be reused. The composition of chlorine dioxide adsorbed on silica gel did not explode on severe shock in repeated tests.

The following examples are given to illustrate the present invention but are not to be construed as limiting.

SILICA GEL ADSORPTION OF
CHLORINE DIOXIDE

A mixture of chlorine dioxide and air containing, by volume, 16 percent $ClO_2$ and 84 percent air was passed through a drying tube filled with silica gel to adsorb the moisture from the air. The dry gas was then passed through an adsorption tube containing 5.93 grams of a commercial grade silica gel contained in a glass tube 1.5 centimeters in diameter and 10 centimeters long. The adsorption tube was immersed in an ice-bath to maintain the temperature about zero degrees centigrade.

The chlorine dioxide was initially adsorbed quantitatively and no trace could be detected in the effluent from the cooled tube. As adsorption proceeded, the silica gel acquired a deep yellow-orange color near one end, and this color gradually progressed throughout the length of the column of adsorbent. When the adsorbent was fully saturated with chlorine dioxide and in equilibrium with the gaseous mixture, the increase in weight was determined. An adsorption of 2.70 grams of chlorine dioxide, equivalent to 45.5 grams per 100 grams of silica gel (31.3 percent $ClO_2$) was obtained.

SILICA GEL ADSORPTION OF CHLORINE

A mixture of chlorine, 3.55 percent, and air, 96.45 percent, by volume, was passed through a drying and adsorption system similar to that above-described. The net weight of the silica gel in the adsorption tube was in this instance 13.85 grams. At a temperature of 24 degrees centigrade, the increase in weight, when fully saturated, was 0.25 gram, equivalent to 1.8 grams of chlorine per 100 grams silica gel (1.77 percent $Cl_2$). At a temperature of zero degrees centigrade the increase in weight, when fully saturated, was 0.55 gram, equivalent to 3.99 grams per 100 grams silica gel (3.86 percent $Cl_2$).

*Example 1.—Preferential Adsorption of Chlorine Dioxide in the Presence of Chlorine*

A mixture containing chlorine dioxide, 6.8 percent, chlorine, 4.2 percent, and air, 89.0 percent, each by volume, was dried and passed through 6.34 grams silica gel contained in an adsorption tube, as previously described. At a temperature of zero degrees centigrade the increase in weight, when fully saturated, was 1.62 grams, equivalent to 25.6 grams per 100 grams silica gel.

To determine the amount of chlorine which might be present along with the chlorine dioxide, the adsorbed gases were desorbed by passing dry air through the composition until the silica gel was practically free from adsorbate, as indicated by the gradual disappearance of the color. The so-formed chlorine dioxide-air mixture was scrubbed free of active gases and analyzed by conventional methods. No more than a trace of chlorine could be found, while the quantity of chlorine dioxide, $ClO_2$, corresponded approximately to 1.62 grams.

This experiment demonstrates the surprising fact that chlorine dioxide is adsorbed preferentially to such an extent that it can actually exclude chlorine from the composition, or displace it from a chlorine-silica gel composition, even in the presence of a very substantial partial pressure of free chlorine.

*Example 2.—Desorption of Chlorine Dioxide Adsorbed on Silica Gel*

A composition of chlorine dioxide-silica gel was made by a procedure similar to that described in Example 1, containing 3.31 grams chlorine dioxide and 9.47 grams silica gel, i.e., 34.95 grams $ClO_2$ per 100 grams silica gel, or 25.9 grams $ClO_2$ per 100 grams of the composition. The chlorine dioxide was removed from the composition by passing through the adsorption tube a stream of air at the rate of about 175 milliliters per minute. The temperature of the composition was raised gradually during two hours from the initial temperature of zero degrees centigrade to a final temperature of about 25 degrees centigrade. In this manner a useful mixture of chlorine dioxide and air, approximating in composition those obtainable from commercial chlorine dioxide generators, was prepared.

TABLE OF DESORPTION

The quantities of chlorine dioxide recovered in specific time intervals, and the average partial pressure of chlorine dioxide in the effluent during each time interval, are shown in the following table, which illustrates how any desired composition within safe, practical limits may be obtained in the effluent gas by properly controlling the flow of air and the temperature of the chlorine dioxide-silica gel composition. The data was gathered from equipment set up as in the previous examples.

TABLE I

| Time Interval, Minutes | Volume of Air, Liters | Chlorine Dioxide, Desorbed | | Average Partial Pressure of $ClO_2$ in Effluent Gas, mm. Hg |
|---|---|---|---|---|
| | | Net g. | Cumulative, percent | |
| 0–10 (10) | 1.75 | 0.44 | 13.2 | 58 |
| 10–22 (12) | 2.1 | 0.75 | 35.9 | 81 |
| 22–35 (13) | 2.28 | 0.69 | 56.9 | 70 |
| 35–49 (14) | 2.45 | 0.47 | 71.0 | 45 |
| 49–60 (11) | 1.93 | 0.26 | 78.7 | 32 |
| 60–80 (20) | 3.5 | 0.29 | 87.5 | 21 |
| 80–114 (34) | 6.0 | 0.20 | 93.6 | 9 |
| Total | 20.0 | 3.1 | | |

*Example 3.—Cyclical Use of Silica Gel for Adsorption of Chlorine Dioxide*

A long, narrow, glass-lined cylinder was filled with a quantity of commercial, granular silica gel sufficient to occupy the space between two perforated ceramic disks near the ends of the tube. Arrangements were made so that a dried gaseous mixture of chlorine dioxide, chlorine, and air could be passed through this apparatus.

In Table II showing the results of several cycles, column "A" indicates the cycle number, "B" shows the composition of the dry gas mixture fed into the silica gel tube during the adsorption part of the cycle, "C" shows the amount of adsorbed gases, in grams, contained in 100 grams of the original silica gel, and "D" shows the composition of the adsorbate, as determined by analysis, after the silica gel had become fully saturated. The second part of Table II shows, in column "E," the proportion, as percent of total, of the adsorbate removed by the stream of dry air during the desorption part of the cycle. Without any attempt to remove the residual adsorbate, the adsorption part of the cycle was repeated. Under "F" the analytical results showing the composition of the gaseous effluent during desorption are recorded, and, finally, column "G" indicates the time in minutes during which desorption was conducted.

The gaseous effluent was thoroughly scrubbed, during desorption, to recover all $ClO_2$ and $Cl_2$, and these were quantitatively estimated. From these results, and the measured volume of air passed through the tube, the results shown in "F" were calculated.

TABLE II

| A | B | | | C | D | |
|---|---|---|---|---|---|---|
| Cycle Number | Composition of Feed by volume | | | Grams Adsorbed Per 100 grams Silica Gel | Composition of Adsorbate, percent by Wt. | |
| | $ClO_2$ | $Cl_2$ | Air | | $ClO_2$ | $Cl_2$ |
| 1 | 6.56 | 4.84 | 88.6 | 30.4 | 98.8 | 1.2 |
| 2 | 7.32 | 5.17 | 87.5 | 30.1 | 98.0 | 2.0 |
| 3 | 7.66 | 3.51 | 88.8 | 29.9 | 98.0 | 2.0 |
| 4 | 7.63 | 4.49 | 87.9 | 30.1 | 97.8 | 2.2 |
| 5 | 7.02 | 6.25 | 86.7 | 29.6 | 98.1 | 1.9 |
| 6 | 7.12 | 5.70 | 87.2 | 28.9 | 97.8 | 2.2 |
| 7 | 6.78 | 4.28 | 88.9 | 28.7 | 97.6 | 2.4 |

| A | E | F | | | G |
|---|---|---|---|---|---|
| Cycle Number | Percent by Wt. of Total Adsorbate Desorbed During this Cycle | Average Composition of Gaseous Effluent, Percent by Volume | | | Time, Minutes |
| | | $ClO_2$ | $Cl_2$ | Air | |
| 1 | 92.5 | 4.41 | 0.06 | 95.5 | 100 |
| 2 | 91.7 | 4.38 | 0.08 | 95.5 | 100 |
| 3 | 93.5 | 4.57 | 0.09 | 95.3 | 100 |
| 4 | 90.6 | 4.18 | 0.09 | 95.7 | 100 |
| 5 | 91.6 | 4.89 | 0.09 | 95.1 | 100 |
| 6 | 91.0 | 4.53 | 0.09 | 95.4 | 100 |
| 7 | 86.0 | 7.07 | 0.17 | 92.7 | 60 |

Various modifications may be made in the method of the present invention without departing from the spirit or scope thereof, and it is to be understood that we limit ourselves only as defined in the appended claims.

We claim:

1. In a process for recovering chlorine dioxide from a substantially anhydrous admixture of gases consisting essentially of an inert gas, chlorine dioxide and chlorine, the step which includes: passing said gases into a confined body of silica gel maintained at a temperature below about 30 degrees centigrade, whereby the chlorine dioxide is selectively adsorbed from said admixture of gases, and venting the chlorine and inert gas from the confined body of silica gel.

2. In a process for recovering chlorine dioxide from a substantially anhydrous admixture of gases consisting essentially of an inert gas, chlorine dioxide and chlorine, the step which includes: passing said gases into a confined body of silica gel maintained at a temperature below about 30 degrees centigrade, whereby the chlorine dioxide is selectively adsorbed from said admixture of gases, and venting the chlorine and inert gas from the confined body of silica gel; and, thereafter passing an inert gas through said silica gel to entrain the chlorine dioxide.

3. The process of claim 1 in which the temperature is maintained at about zero degrees centigrade.

4. The process of claim 2 in which the inert gas is passed through the gel at a temperature above the temperature at which the gel was maintained during the adsorption step.

References Cited in the file of this patent

UNITED STATES PATENTS

| | | |
|---|---|---|
| 1,429,856 | Etter | Sept. 19, 1922 |
| 2,394,887 | Berl | Feb. 12, 1946 |
| 2,519,873 | Berg | Aug. 22, 1950 |
| 2,683,651 | Williamson et al. | July 13, 1954 |
| 2,740,690 | Williamson | Apr. 3, 1956 |
| 2,800,197 | Wynkoop | July 23, 1957 |

OTHER REFERENCES

"Adsorption" by C. L. Mantell, McGraw-Hill Book Co., 1945, first edition, page 12.

UNITED STATES PATENT OFFICE
CERTIFICATE OF CORRECTION

Patent No. 3,063,218                  November 13, 1962

John Carl Pernert et al.

It is hereby certified that error appears in the above numbered patent requiring correction and that the said Letters Patent should read as corrected below.

Column 2, line 16, for "prodluce" read -- produce --; line 25, after "absolute." insert -- Preferably, this partial pressure is maintained below --; column 4, TABLE II, upper portion, fifth column, line 4 thereof, for "30 1" read -- 30.1 --.

Signed and sealed this 21st day of May 1963.

(SEAL)
Attest:

ERNEST W. SWIDER
Attesting Officer

DAVID L. LADD
Commissioner of Patents